United States Patent
Andoh

(10) Patent No.: US 8,612,127 B2
(45) Date of Patent: Dec. 17, 2013

(54) INVERTED VEHICLE

(75) Inventor: Fukashi Andoh, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 481 days.

(21) Appl. No.: 12/993,194

(22) PCT Filed: Feb. 26, 2010

(86) PCT No.: PCT/JP2010/001309
§ 371 (c)(1),
(2), (4) Date: Nov. 17, 2010

(87) PCT Pub. No.: WO2010/125727
PCT Pub. Date: Apr. 11, 2010

(65) Prior Publication Data
US 2011/0071728 A1   Mar. 24, 2011

(30) Foreign Application Priority Data
Apr. 28, 2009  (JP) ................. 2009-109591

(51) Int. Cl.
G06F 17/10 (2006.01)
G06G 7/48 (2006.01)
G05B 19/04 (2006.01)
G05B 19/18 (2006.01)
B25J 9/10 (2006.01)

(52) U.S. Cl.
USPC ........... 701/124; 901/9; 318/568.17; 700/250

(58) Field of Classification Search
USPC ................. 701/36–40, 124; 901/1, 48, 50, 9; 180/337; 280/5.5, 47.22; 700/279–280, 700/250; 318/568.17
See application file for complete search history.

(56) References Cited

U.S. PATENT DOCUMENTS

| 5,455,497 | A * | 10/1995 | Hirose et al. | 318/568.12 |
| 7,370,713 | B1 * | 5/2008 | Kamen | 180/7.1 |
| 2007/0158117 | A1 * | 7/2007 | Alexander | 180/21 |
| 2011/0313568 | A1 * | 12/2011 | Blackwell et al. | 700/245 |

FOREIGN PATENT DOCUMENTS

| JP | 05-305584 A | 11/1993 |
| JP | 05305584 | * 11/1993 |
| JP | 2004-174653 A | 6/2004 |
| JP | 2006-123014 A | 5/2006 |
| JP | 2006-205839 A | 8/2006 |
| JP | 2006-315666 A | 11/2006 |
| JP | 2007-011634 A | 1/2007 |
| JP | 2007-280408 A | 10/2007 |
| JP | 2009-073281 A | 4/2009 |

OTHER PUBLICATIONS

"Damped Harmonic Oscillator", Hyperphysics, Dec. 7, 2008.*
Dynamics 2.004 Dynamics and Control II, Sep. 5, Fall 2007, Lecture 1.*
Zhihua Qua and Joh nDorsey, "Robust Tracking Control of Robots by a Linear Feedback Law", IEEE Transactions on Automatic Control, vol. 36 No. 9, Sep. 1991, pp. 1081-1084.*
Office Action mailed Feb. 14, 2012 in Japanese Application No. 2009/109591 & English translation thereof.

* cited by examiner

Primary Examiner — Khoi Tran
Assistant Examiner — Abby Lin
(74) Attorney, Agent, or Firm — Kenyon & Kenyon LLP

(57) ABSTRACT

The control device of the present invention applies only a damping to a vehicle if a load angular position is in the vicinity of a load angular position reference input. In the preferred embodiment, a control portion has a control switching unit and a switching linear torque unit. The switching linear torque unit calculates a damping torque and a linear feedback torque, the damping torque being obtained by applying a negative sign to a product of the load angular speed and the damping parameter, the linear feedback torque being obtained by multiplying at least one of a position tracking error, a speed tracking error, and an acceleration tracking error by a predetermined gain. The control switching unit switches and outputs the damping torque and the linear feedback torque. The control switching unit outputs the damping torque if the load angular position is in the vicinity of the load angular position reference input, and outputs the linear feedback torque otherwise. The embodiment enables the inverted vehicle to stably travel at a desired speed without vibration.

13 Claims, 9 Drawing Sheets

$L_{10}$: LOAD ANGULAR POSITION WITH PROPOSED CONTROL
$L_{11}$: LOAD ANGULAR POSITION REFERENCE INPUT
$L_{12}$: LOAD ANGULAR POSITION WITH CONVENTIONAL METHOD $L_{20}$: WHEEL HORIZONTAL SPEED WITH PROPOSED CONTROL
$L_{21}$: DESIRED WHEEL HORIZONTAL SPEED
$L_{22}$: WHEEL HORIZONTAL SPEED WITH CONVENTIONAL METHOD

INVERTED VEHICLE

This is a 371 national phase application of PCT/JP2010/001309 filed 26 Feb. 2010, claiming priority to Japanese Patent Application No. JP 2009-109591 filed 28 Apr. 2009, the contents of which are incorporated herein by reference.

FIELD OF THE INVENTION

The present invention relates to a control device (control portion) of an inverted vehicle, and particularly to the control device of the inverted vehicle which has wheel driving means and a link-like load and moves while controlling the balance to maintain the link-like load in an inverted state.

BACKGROUND OF THE INVENTION

A vehicle which has a pair of coaxially-arranged left and right wheels and moves while keeping an inverted state is known. For example, an inverted two-wheel moving robot which autonomously moves while keeping an inverted state is disclosed in Patent document 1 (Japanese Unexamined Patent Application Publication No. 2006-123014). A coaxial two-wheel vehicle which moves while keeping the balance in a state in which a human stands on a step is disclosed in Patent document 2 (Japanese Unexamined Patent Application Publication No. 2006-315666).

FIG. 10 is a diagram showing a configuration of a controller of the inverted two-wheel moving robot disclosed in the Patent document 1.

In FIG. 10, a reference number 1001 denotes a friction observer; a reference number 1002 denotes a target state generator; a reference number 1003 denotes state feedback gains; and a reference number 1004 denotes an inverted robot.

An angular speed reference input is input to the friction observer 1001, and the friction observer 1001 calculates a friction of a motor and a friction between a wheel and a road as an estimated friction and outputs the estimated friction.

The angular speed reference input and the estimated friction are input to the target state generator 1002, and the target state generator 1002 calculates a target state of the inverted robot 1004, which is the subject to be controlled, and outputs the calculation result.

A signal obtained by subtracting a state variable of the inverted robot 1004 from the target state is input to the state feedback gains 1003, and the state feedback gains 1003 calculate state feedback signals, which make the inverted robot 1004 move in a desired manner, based on the input signal, and output the state feedback signals.

The inverted robot 1004 is driven by the sum of the state feedback signals and the estimated friction.

As mentioned above, the conventional method of the inverted two-wheel moving robot controls the motions of the inverted robot 1004 based on a linearized model which is obtained by linearizing the inverted robot 1004, which is the subject to be controlled, in the vicinity of a desired posture.

CITATION LIST

Patent Literature

Patent document 1
Japanese Unexamined Patent Application Publication No. 2006-123014 (FIG. 4)

SUMMARY OF INVENTION

Technical Problem

As explained above, the conventional inverted control executes simple linear feedback control, however the inverted robot or the coaxial two-wheel vehicle has a structure in which a long link is disposed above the coaxial wheels, and which makes the link portion unstable at the target posture and tend to swing.

There is a problem that the link portion is unstable at the target posture and a vibration occurs in the vicinity of the target posture if the feedback control is continuously executed in accordance with tracking error from the target posture, for example, in the conventional method.

Incidentally, feedback gains are adjusted to suppress the vibrations in the vicinity of the target posture in the conventional method. However, the simple adjustment of the feedback gains is not sufficient to maintain the vehicle at the target posture for the purpose of preventing overturning when the posture is widely deviated from the target posture and at the same time to prevent vibrations in the vicinity of the target posture.

The present invention aims to provide a control device for an inverted vehicle capable of moving at a desired horizontal speed while executing stable inverted balance control without causing vibrations.

Solution to Problem

The present invention has a following structure to solve the problems mentioned above.

That is, the present invention provides a control device controlling a travel motion of an inverted vehicle which keeps an inverted state, the inverted vehicle having driving means with a wheel and a load to be controlled to keep the inverted state, the load being disposed above the wheel with a link interposed therebetween, the control device executing control including: defining an angle between a straight line connecting a center of gravity of the load with a center of gravity of the wheel and a vertical straight line as a load angular position; and applying only damping to the inverted vehicle when the load angular position is in the vicinity of a load angular position reference input, the load angular position reference input being a desired load angular position.

In the present invention, it is preferable that a damping range is calculated by multiplying an absolute value of the load angular position reference input by a predetermined coefficient, the damping range being a width in the vicinity of the load angular position reference input.

In the present invention, it is preferable to use a viscous friction as dumping.

In the present invention, it is preferable that a damping parameter is calculated as a function of a load angular position tracking error and the load angular position reference input, the damping parameter being the viscous friction, the load angular position tracking error being defined as a value obtained by subtracting the load angular position from the load angular position reference input.

In the present invention, it is preferable that the damping parameter is calculated by subtracting half of the absolute value of the load angular position reference input from the load angular position tracking error, dividing an absolute value of the subtracted value by the absolute value of the load angular position reference input, and multiplying the divided value by a constant.

In the present invention, it is preferable that the damping parameter is defined as a constant value, the damping parameter being the viscous friction.

In the present invention, it is preferable that the control device has: a switching linear torque calculation unit calculating a damping torque and a linear feedback torque, the damping torque being obtained by applying a negative sign to a product of the load angular speed and the damping parameter, the linear feedback torque being obtained by multiplying at least one of a position tracking error, a speed tracking error, and an acceleration tracking error by a predetermined gain; and a control switching unit switching and outputting the damping torque and the linear feedback torque calculated by the switching linear torque calculation unit.

In the present invention, it is preferable that the control switching unit outputs the damping torque if $0 \leq \text{sgn}(\theta_1^*) \cdot e < h$, and outputs the linear feedback torque otherwise where $e = \theta_1^* - \theta_1$ is satisfied, $\theta_1^*$ is the load angular position reference input, $\theta_1$ is the load angular position, $\text{sgn}(\cdot)$ is a signum function indicating +1 if • is positive, −1 if • is negative, and 0 if • is zero, and h is the damping range calculated by multiplying the absolute value of the load angular position reference input by a predetermined coefficient.

Advantageous Effects of Invention

According to the present invention as mentioned above, it is possible to prevent the load angular position of the vehicle from vibrating in the vicinity of a desired value. Then, it is possible to converge the load angular position of the vehicle on the desired value without causing vibration, and the vehicle can safely move at a desired speed.

DESCRIPTION OF EMBODIMENTS

First Embodiment

An embodiment according to the present invention is explained hereinafter with referring to drawings.

Figure 1:
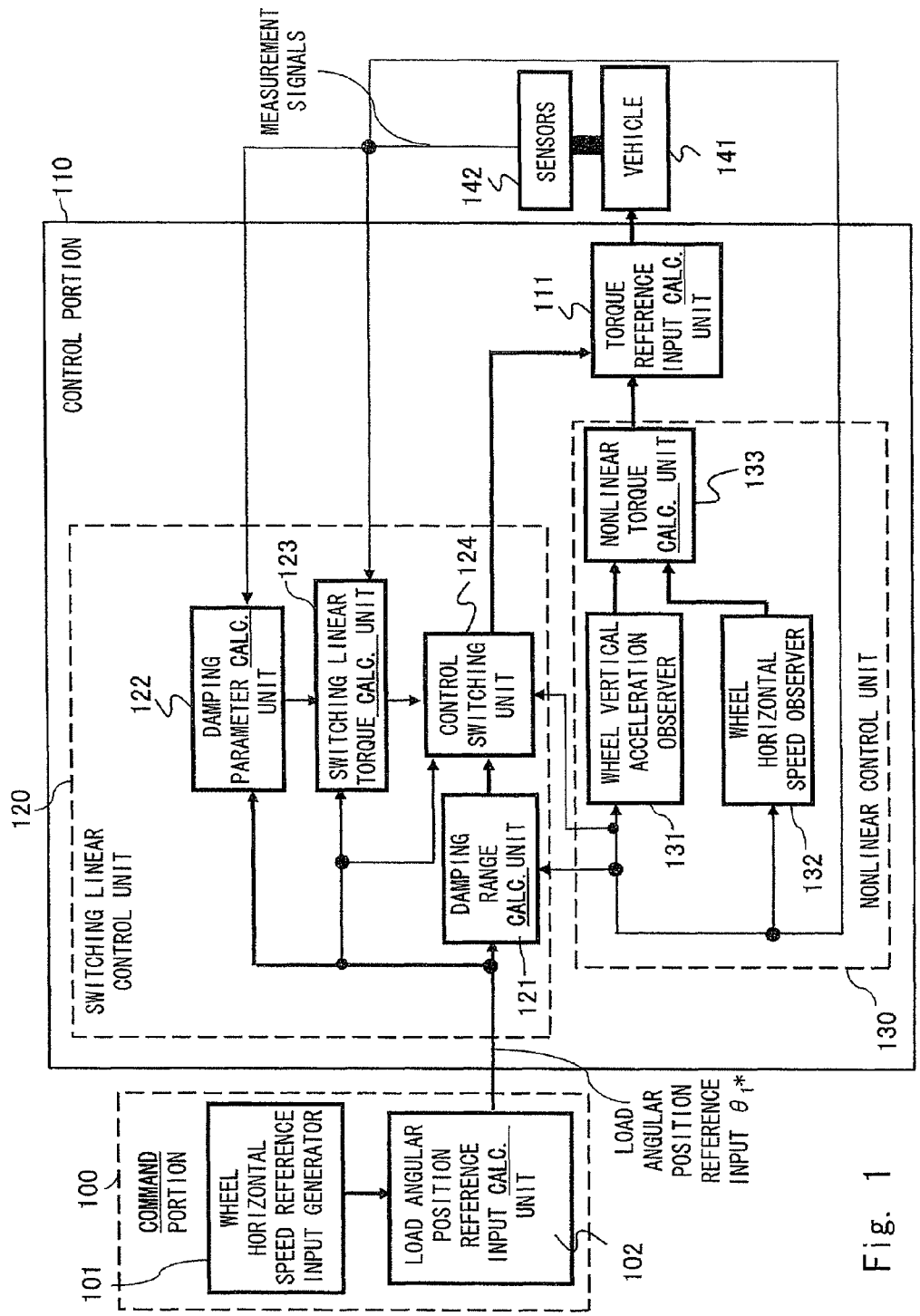
FIG. 1 shows a first embodiment according to an inverted vehicle of the present invention.

FIG. 1 shows a first embodiment according to an inverted vehicle of the present invention.

The inverted vehicle has a vehicle 141, which is the subject to be controlled, sensors 142 measuring the states of the vehicle 141, a command portion 100 generating a desired target state, and a control portion 110 executing control based on measurement signals from the sensors 142 and a reference input from the command portion 100.

Figure 7:
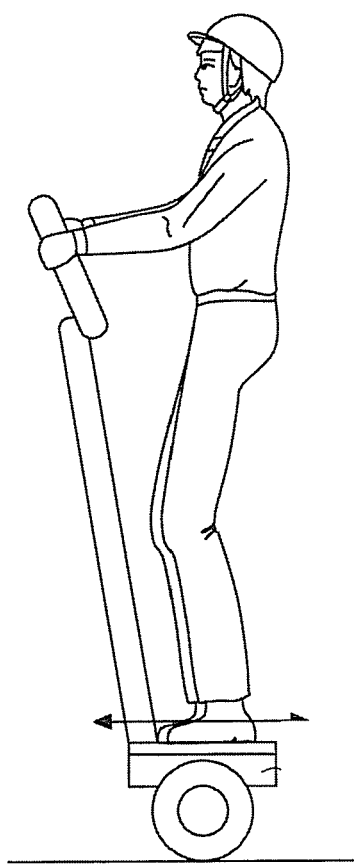
FIG. 7 shows a coaxial two-wheel vehicle as the inverted vehicle.
Figure 8:
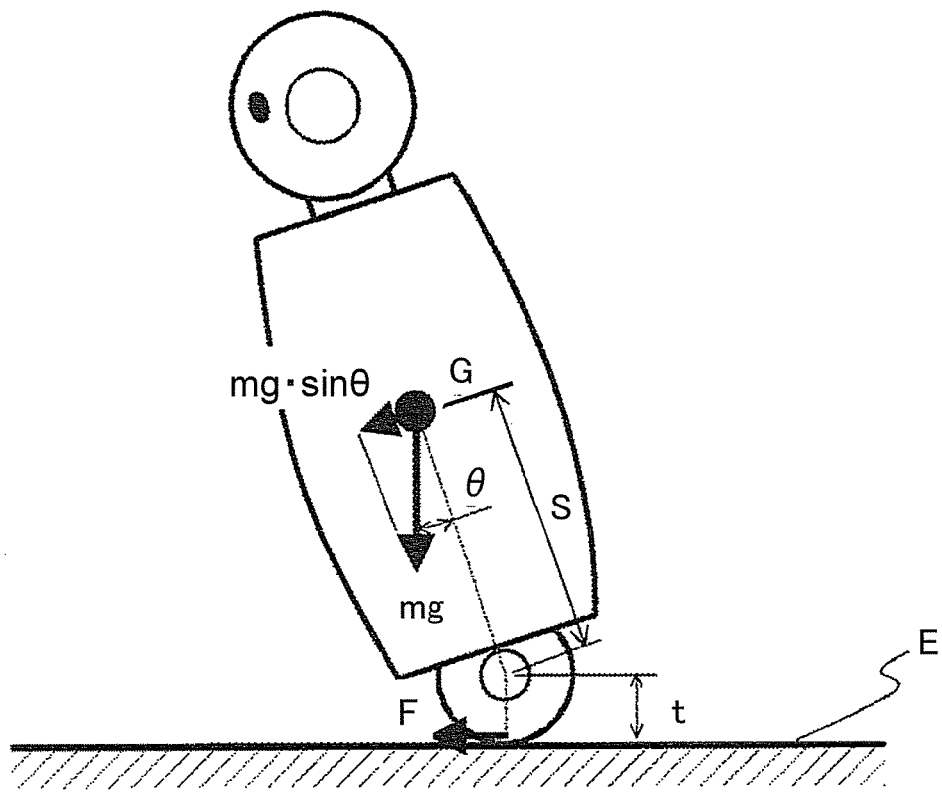
FIG. 8 shows an inverted autonomous moving robot as the inverted vehicle.

The vehicle 141 is generally exemplified by a coaxial two-wheel vehicle (FIG. 7), an inverted type autonomous moving robot (FIG. 8), and so on.

The vehicle is not limited to above examples and might be a vehicle which has driving means with a wheel(s) and a link-like load, and controls the balance to maintain the link-like load in an inverted state.

Figure 9:
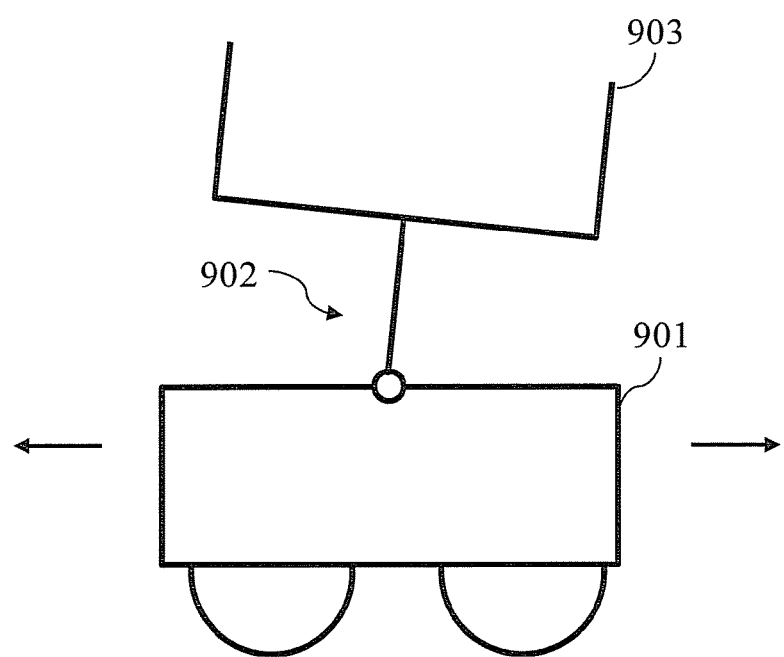
FIG. 9 shows an inverted vehicle having a link mechanism swingably disposed above wheel driving means for four wheels.
Figure 10:
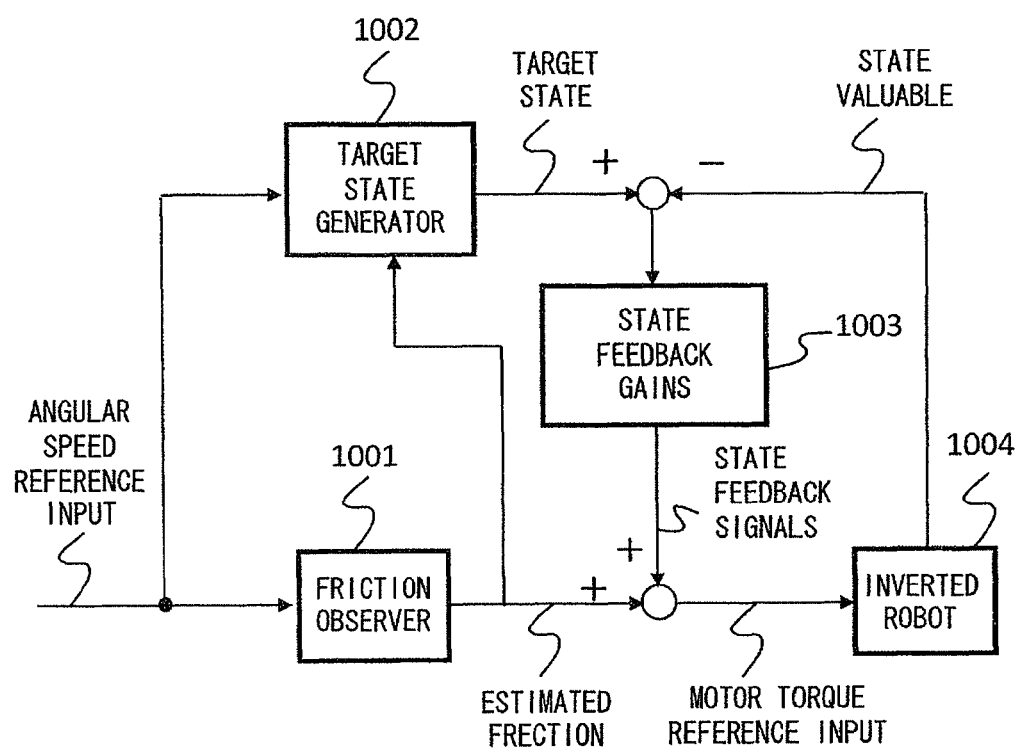
FIG. 10 shows a diagram of a controller of an inverted two-wheel moving robot in the conventional method.

For example, the vehicle might be a structure illustrated in FIG. 9.

FIG. 9 is a structure in which a link mechanism 902 is swingably disposed above wheel driving means 901 for driving four wheels.

For example, an upper side of the link mechanism 902 might be formed like a basket 903, so that the wheel driving means 401 may carry goods in the basket 903.

Hereinafter, the vehicle 141 as mentioned above is modeled on FIG. 2 or the like.

Figure 2:
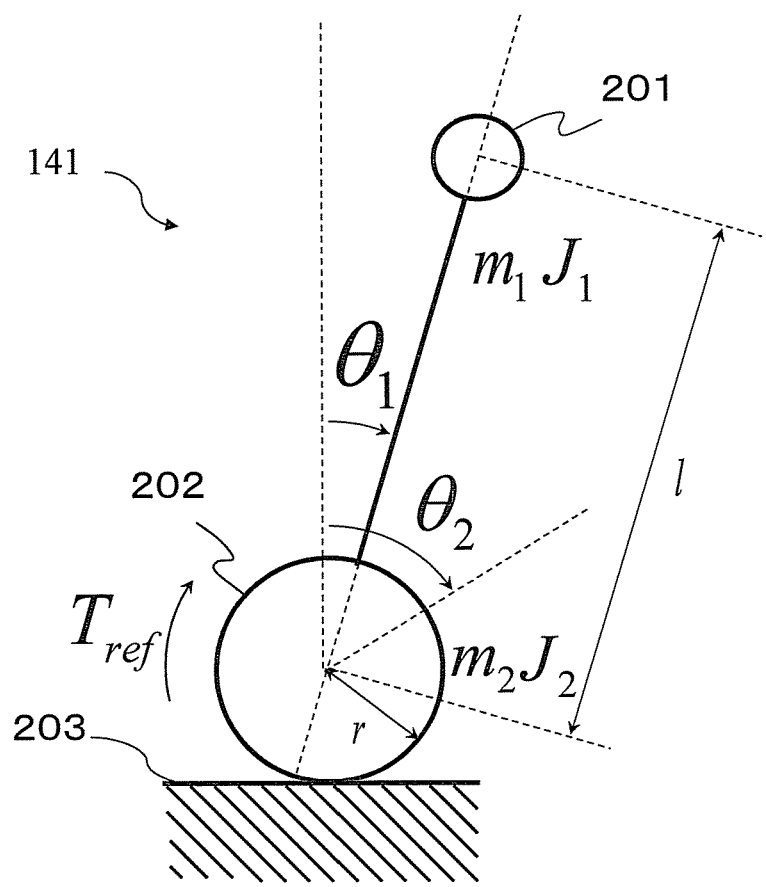
FIG. 2 shows a model of the vehicle.

In FIG. 2, a reference number 201 denotes a load; a reference number 202 denotes wheels; and a reference number 203 denotes a road.

The vehicle 141 keeps an inverted state and moves as illustrated in FIG. 2.

The load 201 is a body of a robot, a passenger or a baggage mounted on the vehicle 141.

The wheels 202 carry the load 201 and propel the load 201 using a friction force acting on the road 203.

The sensors 142 measure an angle ($\theta_1$) of the load 201 and an angle ($\theta_2$) of the wheel 202.

The command portion 100 has a wheel horizontal speed reference input generator 101 and a load angular position reference input calculation unit 102.

The wheel horizontal speed reference input generator 101 generates and outputs a wheel horizontal speed reference input as a desired horizontal moving speed of the wheel 202 of the vehicle 141.

The load angular position reference input calculation unit 102 to which the wheel horizontal speed reference is input calculates and outputs a load angular position reference input such that the wheel horizontal speed follows the wheel horizontal speed reference input when the road 203 on which the vehicle 141 moves is horizontal.

The control portion 110 has a switching linear control portion 120, a nonlinear control portion 130, and a torque reference input calculation unit 111.

The switching linear control unit 120 has a damping range calculation unit 121, a damping parameter calculation unit 122, a switching linear torque calculation unit 123, and a control switching unit 124.

The load angular position reference input from the load angular position reference input calculation unit 102, and the load angular position $\theta_1$ and the wheel angle $\theta_2$, both of which are measurement signals from sensors 142, are input to the damping range calculation unit 121.

The damping range calculation unit 121 calculates a range of the load angular position as a damping range within which only a viscous friction is added for the control of the vehicle 141, based on the input signals, and outputs the calculation result.

The load angular position reference input ($\theta_1^*$) from the load angular position reference input calculation unit 102, and the load angular position ($\theta_1$) and the wheel angle ($\theta_2$), both of which are measurement signals from sensors 142, are input to the damping parameter calculation unit 122.

The damping parameter calculation unit 122 performs calculation based on the input signals and outputs a damping parameter used for control within the damping range.

The load angular position reference input ($\theta_1^*$) from the load angular position reference input calculation unit 102, the damping parameter from the damping parameter calculation unit 122, and the load angular position ($\theta_1$) and the wheel angle ($\theta_2$), both of which are measurement signals from sensors 142, are input to the switching linear torque calculation unit 123.

The switching linear torque calculation unit 123 calculates and outputs a damping torque and a linear feedback torque. The damping torque is obtained by changing the sign of the product of the load angular speed and the damping parameter, and the linear feedback torque is obtained by multiplying at least one of a position tracking error, a speed tracking error, and an acceleration tracking error by a predetermined gain.

The damping range calculated by the damping range calculation unit 121, the measurement signals from sensors 142, and the switching linear torque calculated by the switching linear torque calculation unit 123 are input to the control switching unit 124. The control switching unit 124 switches and outputs the switching linear torque calculated by the switching linear torque calculation unit 123.

The nonlinear control unit 130 has a wheel vertical acceleration observer 131, a wheel horizontal speed observer 132, and a nonlinear torque calculation unit 133.

The measurement signals from the sensors 142 are input to the wheel vertical acceleration observer 131, and the wheel vertical acceleration observer 131 estimates a vertical acceleration of the wheel 202 based on the input signals and outputs the estimation result as an estimated wheel vertical speed.

The measurement signals are input to the wheel horizontal speed observer 132, and the wheel horizontal speed observer 132 estimates a horizontal speed of wheel 202 based on the input signals and outputs it as an estimated wheel horizontal speed.

The estimated wheel vertical acceleration and the estimated wheel horizontal speed are input to the nonlinear torque calculation unit 133, and the nonlinear torque calculation unit 133 calculates and outputs a nonlinear torque indicating nonlinear dynamics of the vehicle 141.

The switching linear torque, which is switched and output by the control switching unit 124, and the nonlinear torque, which is output from nonlinear torque calculation unit 133, are input to the torque reference input calculation unit 111, and the torque reference input calculation unit 111 outputs a torque reference input obtained by dividing the sum of these input signals by the radius of the wheel 202.

The vehicle 141 is driven based on the torque reference input.

Hereinafter, a detailed control mechanism of the control portion 110 according to the first embodiment for motion control of the vehicle 141 is explained.

In FIG. 2, the parameters are set as described below.

The symbol $m_1$ is a load mass;
$J_1$ is a load inertia moment;
$m_2$ is a wheel mass;
$J_2$ is a wheel inertia moment;
$l$ is a distance between the center of gravity of the load and the center of the gravity of the wheel;
$r$ is a wheel radius;
$\theta_1$ is the load angular position;
$\theta_2$ is the wheel angle; and
$T_{ref}$ is the torque reference input.

Furthermore, assuming that a wheel horizontal position is $x_2$ and a wheel vertical position is $y_2$, a load horizontal position $x_1$ and a load vertical position $y_1$ are expressed by Equation (1) and Equation (2) respectively as shown below.

[Equation 1]

$$x_1 = l \sin\theta_1 + x_2 \tag{1}$$

[Equation 2]

$$y_1 = l \cos\theta_1 + y_2 \tag{2}$$

A kinetic energy T and a potential energy V of the vehicle 141 are expressed by Equation (3) and Equation (4) respectively as shown below using equation (1) and equation (2).

[Equation 3]

$$\begin{aligned}T &= \frac{1}{2}m_1(\dot{x}_1^2 + \dot{y}_1^2) + \frac{1}{2}J_1\dot{\theta}_1^2 + \\ &\quad \frac{1}{2}m_2(\dot{x}_2^2 + \dot{y}_2^2) + \frac{1}{2}J_2\dot{\theta}_2^2 \\ &= \frac{1}{2}m_1(\dot{x}_2^2 + \dot{y}_2^2 + l^2\dot{\theta}_1^2 + 2l\dot{\theta}_1\dot{x}_2\cos\theta_1 + 2r\dot{\theta}_2\dot{x}_2 - 2l\dot{\theta}_1\dot{y}_2\sin\theta_1) + \\ &\quad \frac{1}{2}J_1\dot{\theta}_1^2 + \frac{1}{2}m_2(\dot{x}_2^2 + \dot{y}_2^2) + \frac{1}{2}J_2\dot{\theta}_2^2\end{aligned} \tag{3}$$

[Equation 4]

$$V = m_1 g y_1 + m_2 g y_2 \tag{4}$$

Then, the equation of motion of the vehicle 141 is derived as Equations (5) through (8) using the Euler-Lagrange equation.

[Equation 5]

$$\begin{aligned}(m_1 l^2 + J_1)\ddot{\theta}_1 + m_1 l\ddot{x}_2\cos\theta_1 - m_1 l\ddot{y}_2\sin\theta_1 - m_1 l\dot{\theta}_1\dot{x}_2\sin\theta_1 - \\ m_1 l\dot{\theta}_1\dot{y}_2\cos\theta_1 + m_1 l\dot{\theta}_1\dot{x}_2\sin\theta_1 + m_1 l\dot{\theta}_1\dot{x}_2\sin\theta_1 + m_1 l\dot{\theta}_1^2\dot{x}_2\cos\theta_1 + \\ m_1 l\dot{\theta}_1\dot{y}_2\cos\theta_1 + m_1 l\dot{\theta}_1\ddot{y}_2\cos\theta_1 - m_1 l\dot{\theta}_1^2\dot{y}_2\sin\theta_1 = 0\end{aligned} \tag{5}$$

[Equation 6]

$$J_2\ddot{\theta}_2 = T_{ref} \tag{6}$$

[Equation 7]

$$(m_1+m_2)\ddot{x}_2 + m_1 l\ddot{x}_2\cos\theta_1 - m_1 l\dot{\theta}_1\dot{x}_2\sin\theta_1 = 0 \tag{7}$$

[Equation 8]

$$(m_1+m_2)\ddot{y}_2 - m_1 l\ddot{x}_2\sin\theta_1 - m_1 l\dot{\theta}_1{}^2\cos\theta_1 m_2 g = 0 \tag{7}$$

The symbol g is the gravitational acceleration.

Furthermore, Equation (6) and Equation (7) are rewritten as Equation (9) and Equation (10) by taking account of a viscous friction between the wheel 202 and the road 203.

The symbol D is the viscous friction coefficient.

[Equation 9]

$$J_2 \ddot{\theta}_2 + D\left(\dot{\theta}_2 - \frac{\dot{x}_2}{r}\right) = T_{ref} \quad (9)$$

[Equation 10]

$$(m_1+m_2)\ddot{x}_2+m_1 l \ddot{x}_2 \cos\theta_1 - m_1 l \dot{\theta}_1 \dot{x}_2 \sin\theta_1 + D(r\dot{\theta}_2 - \dot{x}_2) = 0 \quad (10)$$

Equation (11) is derived from Equation (9) and Equation (10).

[Equation 1]

$$(m_1+m_2)\ddot{x}_2+m_1 l \ddot{x}_2 \cos\theta_1 - m_1 l \dot{\theta}_1 \dot{x}_2 \sin\theta_1 - rJ_2\ddot{\theta}_2 = -rT_{ref} \quad (11)$$

Equation (12) is obtained by subtracting Equation (11) from Equation (5).

[Equation 12]

$$(m_1 l^2 + J_1)\ddot{\theta}_1 + N_x + N_y = rT_{ref} \quad (12)$$

$$N_x = -(m_1+m_2)\ddot{x}_2 + m_1 l \dot{\theta}_1 \dot{x}_2 \sin\theta_1 + m_1 l \dot{\theta}_1 \dot{x}_2 \sin\theta_1 + m_1 l \dot{\theta}_1^2 \dot{x}_2 \cos\theta_1$$

$$N_y = rJ_2\ddot{\theta}_2 - m_1 l \ddot{y}_2 \sin\theta_1 - m_1 l \dot{\theta}_1 \dot{y}_2 \cos\theta_1 +$$
$$m_1 l \dot{\theta}_1 \dot{y}_2 \cos\theta_1 + m_1 l \dot{\theta}_1 \ddot{y}_2 \cos\theta_1 - m_1 l \dot{\theta}_1^2 \dot{y}_2 \sin\theta_1$$

The symbol $N_x$ is a nonlinear term that is a function of the wheel horizontal position $x_2$, and the symbol $N_y$ is a nonlinear term that is a function of the wheel vertical position $y_2$.

Assuming that the load angular position $\theta_1$ varies much slower than the wheel horizontal position $x_2$, Equation (11) is rewritten as Equation (13).

[Equation 13]

$$c_1 \dot{x}_2 + c_2 \ddot{x}_2 = rJ_2\ddot{\theta}_2 - T_{ref}$$

$$c_1 = m_1 + m_2 + m_1 l \cos\theta_1$$

$$c_2 = -m_1 l \dot{\theta}_1 \sin\theta_1 \quad (13)$$

The part of Equation (13) that varies much slower than the wheel horizontal position $x_2$ is expressed as Constants c1, c2 and c3.

A wheel horizontal speed $dx_2/dt$ is expressed as Equation (14) using Equation (13).

[Equation 14]

$$\dot{x}_2 = L^{-1}\left\{\frac{1}{c_1 s + c_2}(s^2 \Theta_2 - rT_{ref})\right\} \quad (14)$$

The symbol $s^2 \cdot \Theta_2$ is the Laplace transform of a wheel acceleration ($d^2\theta_2/dt^2$), and the symbol L is the Laplace transform.

The wheel horizontal speed observer 132 calculates the estimated wheel horizontal speed using Equation (14).

Meanwhile, Equation (15) is derived by solving Equation (8) for a wheel vertical acceleration ($d^2 y_2/dt^2$).

[Equation 15]

$$\ddot{y}_2 = \frac{m_1 l \ddot{\theta}_1 \sin\theta_1 + m_1 l \dot{\theta}_1^2 \cos\theta_1 - m_2 g}{(m_1 + m_2)} \quad (15)$$

The wheel vertical acceleration observer 131 calculates the estimated wheel vertical acceleration using Equation (15).

Assuming that the wheel horizontal speed reference input is $v_2^*$ (=the first order time derivative of $x_2^*$), the load angular position reference input $\theta_1^*$, which is the load angular position $\theta_1$ which the wheel horizontal speed ($dx_2/dt$) becomes equal to the wheel horizontal speed reference input $v_2^*$ for the flat road 203, is expressed by Equation (16). That is, the load angular position reference input $\theta_1^*$ is the arctangent of the value obtained by dividing the wheel horizontal speed reference input by the gravitational acceleration.

[Equation 16]

$$\theta_1^* = \tan^{-1}\frac{\dot{x}_2^*}{g} \quad (16)$$

The wheel horizontal speed reference input generator 101 outputs the wheel horizontal speed reference input $v_2^*$ (=the first order time derivative of $x_2^*$), and the load angular position reference input calculation unit 102 calculates the load angular position reference input $\theta_1^*$ using Equation (16) and outputs the calculation result.

Equation (17) is derived by substituting Equation (14) and Equation (15) into Equation (12).

[Equation 17]

$$(m_1 l^2 + J_1)\ddot{\theta}_1 + N_x + N_y = rT_{ref} \quad (17)$$

Equation (17) is rewritten as Equation (18).

[Equation 18]

$$(m_1 l^2 + J_1)\ddot{\theta}_1 = u$$

$$u = rT_{ref} - N_x - N_y \quad (18)$$

The symbol u is the switching linear torque.

Then, consider the switching linear torque u in Equation (19) with which the load angular position $\theta_1$ converges to the load angular position reference input $\theta_1^*$.

[Equation 19]

$$u = \begin{cases} \beta \dot{e} + \kappa e & \operatorname{sgn}(\theta_1^*)e < 0 \\ -\gamma \dot{\theta}_1 & 0 \leq \operatorname{sgn}(\theta_1^*)e < h \\ \beta \dot{e} + \kappa e & \operatorname{sgn}(\theta_1^*)e \geq h \end{cases} \quad (19)$$

Where, $e = \theta_1^* - \theta_1$ is the load angular position tracking error;

$\beta$ is a speed proportional control gain;

$\kappa$ is a position proportional control gain;

$\gamma$ is the damping parameter; and $\operatorname{sgn}(\bullet)$ is the signum function indicating +1 if • is positive, −1 if • is negative, and 0 if • is zero.

Further, $h=c|\theta_1^*|$ is the damping range to prevent chattering caused by the feedback control, and c is a parameter of the damping range h.

The switching torque u in Equation (19) implies that it is possible to stably converge the load angular position $\theta_1$ on the load angular position reference input $\theta_1^*$ without causing chattering by causing a motion of the load 201 in which the viscous friction is the damping parameter $\gamma$ when the tracking error between the load angular position $\theta_1$ and the load angular position reference input $\theta_1^*$ is small, in particular, when the tracking error in the direction of decrease of the absolute value of the load angular position $\theta_1$ is within the damping range h.

Furthermore, the switching torque u implies that it is possible to converge the load angular position $\theta_1$ on the load angular position reference input $\theta_1^*$ by performing feedback control with stiffness given by the position proportional control gain $\kappa$ and with the viscous friction given by the speed proportional control gain $\beta$ when the tracking error is outside of the damping range h.

It is preferable to set the damping parameter $\gamma$ as a function of the load angular position reference input $\theta_1^*$ and the load angular position tracking error e as in Equation (20), for example.

[Equation 20]

$$\gamma = \frac{2\beta}{|\theta_1^*|}\left|e - \frac{|\theta_1^*|}{2}\right| \qquad (20)$$

In other words, the switching linear control unit 120 receives the load angular position reference input $\theta_1^*$ from the load angular position reference input calculation unit 102, and the load angular position reference input $\theta_1^*$ is input to the damping range calculation unit 121, the damping parameter calculation unit 122, and the switching linear torque calculation unit 123.

Then, the damping range calculation unit 121 calculates the damping range as $h=c|\theta_1^*|$ using the load angular position reference input $\theta_1^*$ and parameter c.

The obtained damping range h is output to the control switching unit 124.

The damping parameter calculation unit 122 calculates the damping parameter $\gamma$ in accordance with Equation (20), and outputs the calculation result to the switching linear torque calculation unit 123.

The switching linear torque calculation unit 123 calculates the switching linear torque u expressed by Equation (19) using the damping parameter $\gamma$ from the damping parameter calculation unit 122, and the speed proportional control gain $\beta$, and the position proportional control gain $\kappa$. Both gains are determined in advance.

The calculated switching linear torque u is output to the control switching unit 124.

The control switching unit 124 switches and selects the switching linear torque u calculated by the switching linear torque calculation unit 123 by referring to the load angular position tracking error e and the damping range h.

The switching linear torque selected by the control switching unit 124 is output to the torque reference input calculation unit 111.

Furthermore, the nonlinear torque calculation unit 133 calculates the nonlinear torque as Nx+Ny in Equation (12) based on the estimated wheel vertical acceleration calculated using Equation (15) and the estimated wheel horizontal speed calculated using Equation (14) and outputs the calculation result.

The torque reference input calculation unit 111 calculates the torque reference input $T_{ref}$ using the switching linear torque u and the nonlinear torque Nx+Ny in accordance with Equation (21) and output the calculation result.

[Equation 21]

$$T_{ref} = \frac{u + N_x + N_y}{r} \qquad (21)$$

Where, r is the wheel radius.

The vehicle 141 is driven and controlled by the torque $T_{ref}$.

The first embodiment having the structure as described above has following advantageous effects.

(1) In the first embodiment, the load angular position $\theta_1$ is divided into three ranges as expressed in Equation (19), and the optimum torque reference input can be calculated in each range.

Furthermore, the control switching unit 124 switches the control depending on whether the load angular position is within the damping range or out of the damping range.

Therefore, it is possible to smoothly converge the load angular position $\theta_1$ on the load angular position reference input $\theta_1^*$ without causing vibration of the load angular position $\theta_1$ in the vicinity of the load angular position reference input $\theta_1^*$.

As a result, it is possible to accomplish a stable horizontal travel motion.

(2) The damping parameter calculation unit 122 is used and the damping parameter $\gamma$ is set by Equation (20). Therefore, it is possible to converge the load angular position $\theta_1$ on the load angular position reference input $\theta_1^*$ more smoothly and quickly than when the damping parameter $\gamma$ is a constant value.

(3) The vehicle 141 is controlled by using the estimated wheel horizontal speed in Equation (14), and it is possible to converge the wheel horizontal speed $v_2$ (=the first order time derivative of $x_2$) of the vehicle 141 on the wheel horizontal speed reference input $v_2^*$ (=the first order time derivative of $x_2^*$) even if the wheel 202 somewhat slips on the road 203.

(4) The vehicle 141 is controlled by using the estimated wheel vertical acceleration in Equation (15), and it is possible to stably control the load angular position $\theta_1$ as long as the wheel 202 is in contact with the road 203, even if the road 203 is bumpy.

AN EXPERIMENTAL EXAMPLE

Hereinafter, experimental examples verifying the advantageous effects of the present invention are described.

A simulation result of the first embodiment is described as the experimental example.

Here are the values used for the simulation:
$m_1$=70 [kg],
$J_1$=25.2 [kg·m$^2$],
$m_2$=15 [kg],
$J_2$=0.075 [kg·m$^2$],
l=0.9 [m],
r=0.1 [m],
D=0.1 [N·s/m],
g=9.8 [m/s$^2$],
T=1×10$^{-3}$ [s],
$\kappa$=40 [s$^{-1}$]
$J_{10}=m_1\times l^2+J_1$ [kg·m$^2$], $\beta_0 = 2\pi\kappa$ [s$^{-1}$],
$\beta = \beta_0 \times J_{10}$ [N·m·s/rad],
$\gamma = 0.1$ [N·m·s/rad],
pcl=[−49.9, −201.4] [rad/s], and
td=0.5[s].

Where, m1 is the load mass;

$J_1$ is the load inertia moment;

$m_2$ is the wheel mass;

$J_2$ is the wheel inertia moment;

l is the distance between the center of gravity of the load and the center of gravity of the wheel;

r is the wheel radius;

D is the viscous friction between the wheel and the road;

g is the gravitational acceleration;

T is a sampling time;

$\kappa$ is the position proportional control gain according to the present invention;

$J_{10}$ is a nominal inertia moment;

$\beta_0$ is a normalized speed proportional control gain according to the present invention;

$\beta$ is a speed proportional control gain according to the present invention;

$\gamma$ is the friction parameter according to the present invention;

pcl is a closed loop pole according to the conventional method; and td is an impulse disturbance time.

The viscous friction between the wheel and the road D is a viscous friction acting between the wheel 202 and the road 203 as illustrated in FIG. 2.

The nominal inertia moment $J_{10}$ is a parameter normalizing a speed control loop in the present invention.

The symbol pcl is a pole of a closed loop used in state feedback control according to the conventional method.

Assume a case where there is an impulse-like acceleration disturbance input to the wheel 202 in the upward vertical direction at an impulse disturbance time td.

Figure 3:
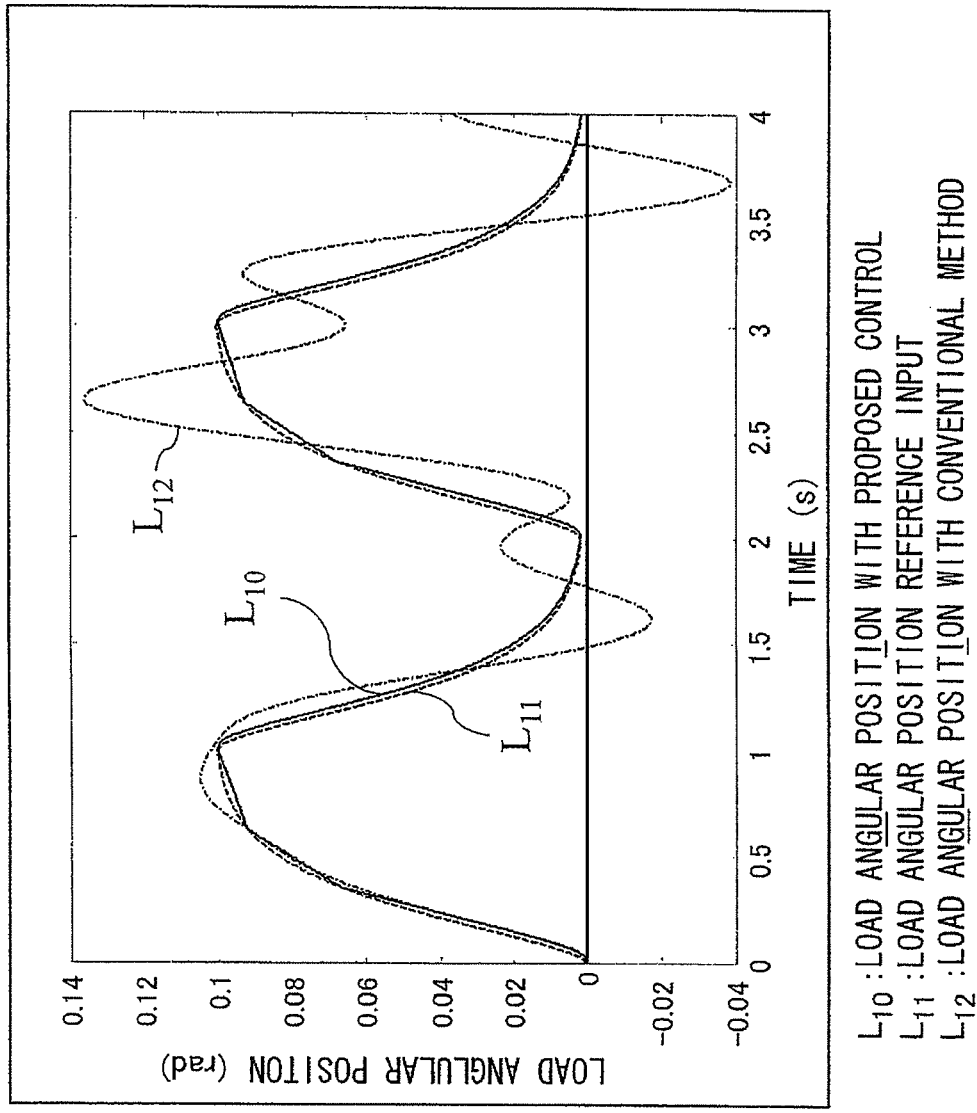
FIG. 3 shows a simulation result of the load angular position.
Figure 4:
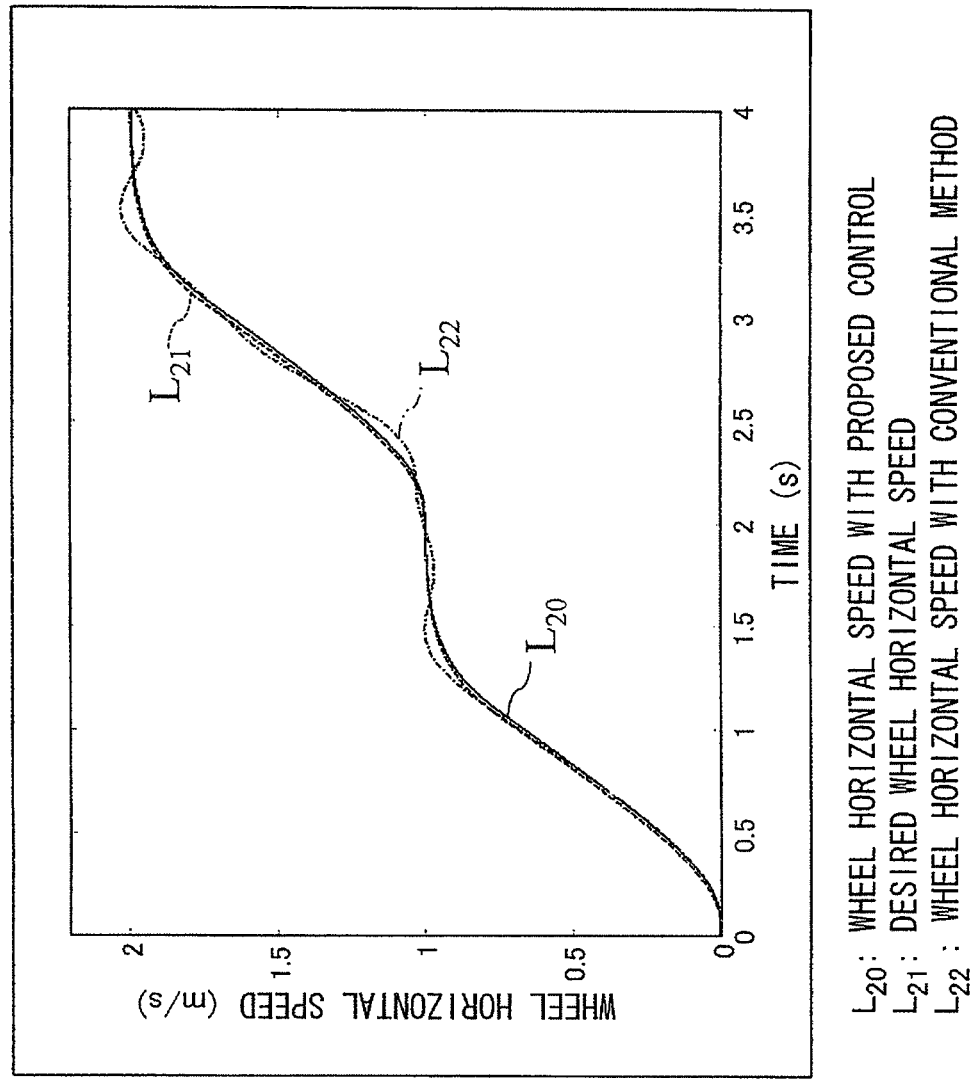
FIG. 4 shows a simulation result of wheel horizontal speed.

FIGS. 3 and 4 are plots showing the simulation result.

FIG. 3 shows a variation of the load angular position.

In FIG. 3, a solid line $L_{10}$ denotes the load angular position with proposed control; the broken line $L_{11}$ denotes the load angular position reference input; and the chain line $L_{12}$ denotes the load angular position with the conventional method.

It has been turned out that the present invention and the conventional method equally follow the load angular position reference input before the 0.5 [s]. However, when the acceleration disturbance is applied, after the 0.5 [s], the load angular position oscillates in the conventional method. In contrast to this, the load angular position continues to follow the load angular position reference input without causing oscillation even after the acceleration disturbance is applied in the present invention.

Then, the time change of the load angular position of the present invention becomes a polygonal line because the control is performed in such a manner that only the damping is applied within the damping range in Equation (19). This implies that by employing the damping range, the load angular position is less likely to vibrate in the vicinity of the load angular position reference input.

Furthermore, the wheel vertical acceleration observer 131 calculates the estimated wheel vertical acceleration in Equation the (15), and the nonlinear torque calculation unit 133 calculates the nonlinear torque Ny. As a result, it is possible to compensate the acceleration disturbance that is applied to the wheel 202 in the vertical direction due to the bumps on the road 203. This shows that it is possible to stabilize the load angular position in the present invention even if the acceleration disturbance is applied.

FIG. 4 shows a variation of the horizontal speed of the wheel.

In FIG. 4, a solid line $L_{20}$ denotes the wheel horizontal speed with the proposed control; the broken line $L_{21}$ denotes the desired wheel horizontal speed; and the chain line $L_{22}$ denotes the wheel horizontal speed with the conventional method.

It has been turned out that both the present invention and the conventional method follow the desired wheel horizontal speed before 0.5 [s] when the acceleration disturbance is applied. However, after the 0.5 [s], the wheel horizontal speed becomes vibrational in the conventional method. In contrast to this, the wheel horizontal speed does not become vibrational and follows the desired wheel horizontal speed in the present invention.

Modified Example 1

In the first embodiment, the damping parameter $\gamma$ is calculated by the damping parameter calculation unit 122 in accordance with equation (20). However, the damping parameter $\gamma$ may be a predetermined fixed value.

Figure 5:
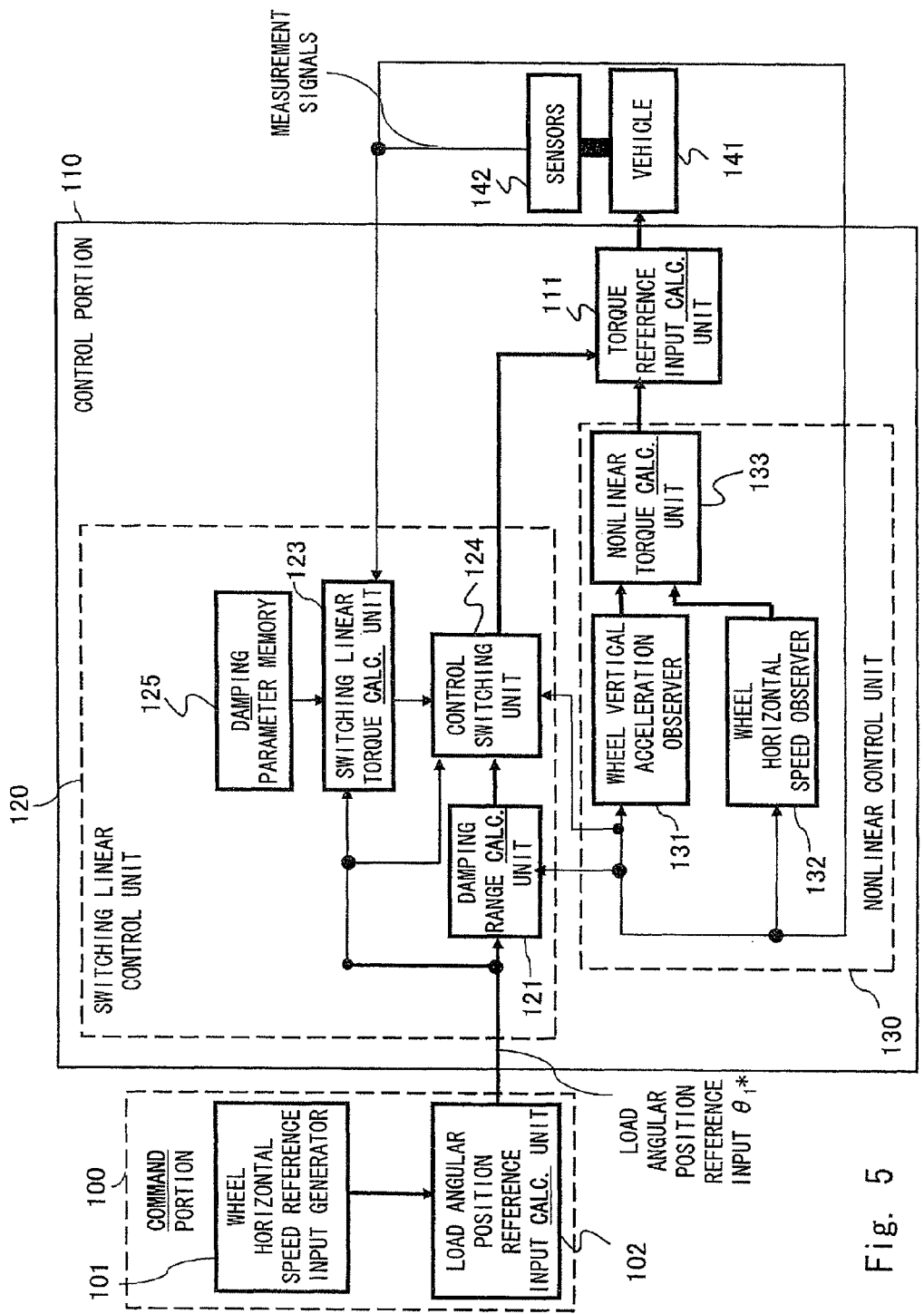
FIG. 5 shows the first modified example.

In other words, the predetermined damping parameter may be set and stored into a damping parameter memory (damping parameter memory) 125 as shown in FIG. 5. Then, the damping parameter memory 125 may supply a value of the damping parameter $\gamma$ to the switching linear torque calculation unit 123.

Modified Example 2

In the first embodiment, it is explained as the most preferable embodiment in which the nonlinear control unit 130 is used. However, the nonlinear control unit 130 is not indispensable if stable control in which the load angular position $\theta_1^*$ is smoothly converged on the load angular position reference input $\theta_1^*$ is accomplished without causing vibration in the vicinity of the load angular position reference input $\theta_1^*$.

Figure 6:
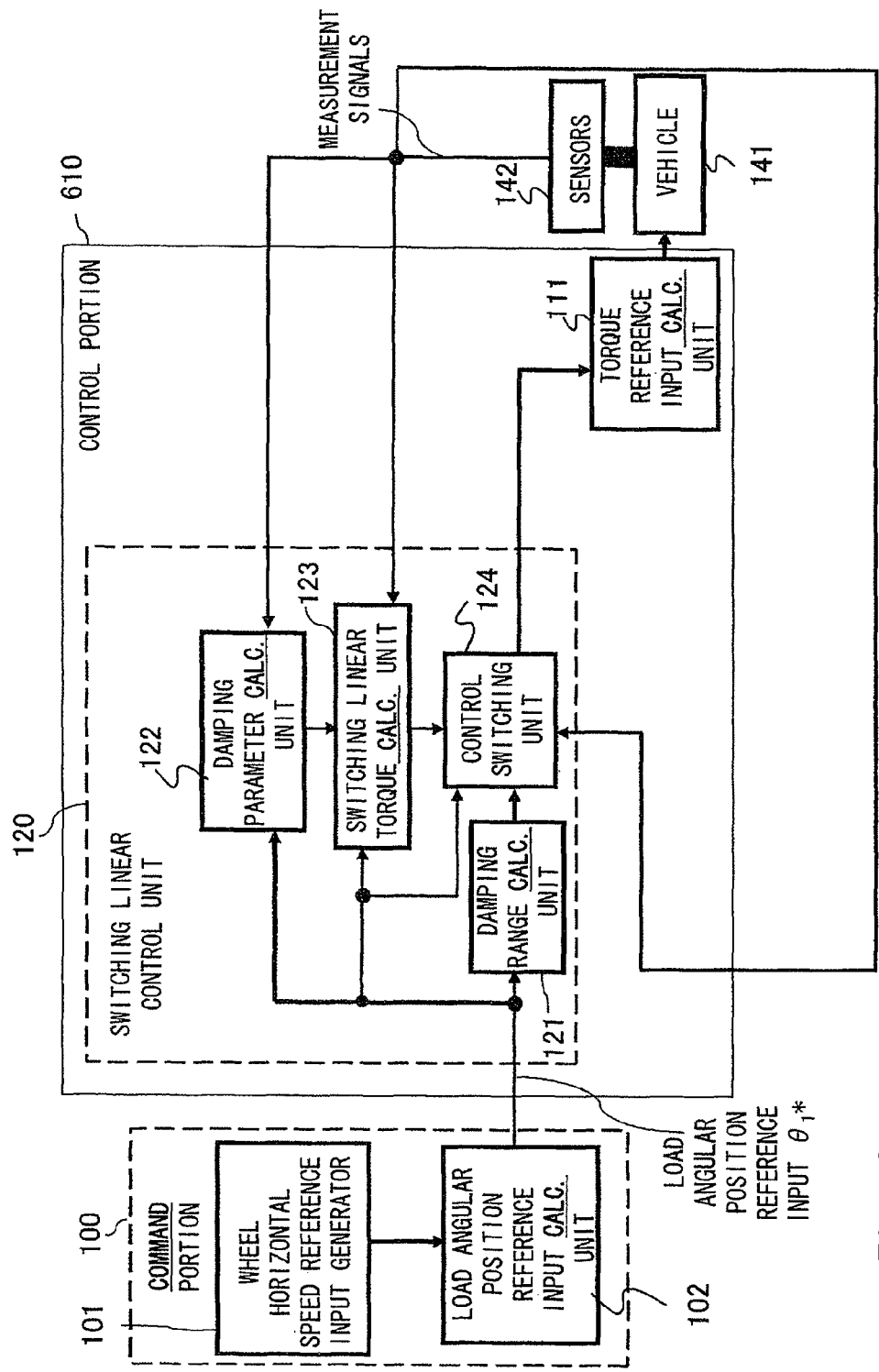
FIG. 6 shows the second modified example.

In other words, the nonlinear control unit 130 may be omitted from the control portion 610 as illustrated in FIG. 6.

Here, if the nonlinear control unit 130 is omitted and only the switching linear control unit 120 is used, it is preferable to set the gains with which the nonlinear terms that act as the disturbance are suppressed as much as possible, by adjusting the gains of the linear feedback torque of the switching linear torque u calculated in the switching linear torque calculation unit 123.

Needless to say, it is preferable to dispose the nonlinear control unit 130 to take account of the nonlinear terms due to travelling on the uneven and bumpy road, a collision with an obstacle, and a slipping of the wheel.

The present invention is not limited to the above embodiments and includes modifications and improvements within a range accomplishing the purpose of the present invention.

For example, the position P/speed P control may be replaced with any control law such as the position P/speed PI control, the position P/speed I-P control, and the position PID control in Equation (19).

This application is based on and claims the benefit of priority from Japanese patent application No. 2009-109591, filed on Apr. 28, 2009, the disclosure of which is incorporated herein its entirety by reference.

INDUSTRIAL APPLICABILITY

According to the present invention, an inverted two-wheel vehicle can move at a desired horizontal speed without causing a turnover and an oscillation even if there is unevenness on the road or even if the vehicle collides with a human or an object. Therefore, the present invention is widely applicable to a two-wheel robot travelling at an inverted state, an electric wheelchair, an automatic delivery device, a robot working at narrow space such as a lifesaving at the time of disaster, and an assembly apparatus assembling the electric device sensitive to a vibration.

REFERENCE SIGNS LIST

100 COMMAND PORTION
101 WHEEL HORIZONTAL SPEED REFERENCE INPUT GENERATOR
102 LOAD ANGULAR POSITION REFERENCE INPUT CALCULATION UNIT
110, 610 CONTROL PORTION
111 TORQUE REFERENCE INPUT CALCULATION UNIT
120 SWITCHING LINEAR CONTROL UNIT
121 DAMPING RANGE CALCULATION UNIT
122 DAMPING PARAMETER CALCULATION UNIT
123 SWITCHING LINEAR TORQUE CALCULATION UNIT
124 CONTROL SWITCHING UNIT
125 DAMPING PARAMETER MEMORY
130 NONLINEAR CONTROL UNIT
131 WHEEL VERTICAL ACCELERATION OBSERVER
132 WHEEL HORIZONTAL SPEED OBSERVER
133 NONLINEAR TORQUE CALCULATION UNIT
141 VEHICLE
142 SENSORS
201 LOAD
202 WHEEL
203 ROAD
1001 FRICTION OBSERVER
1002 TARGET STATE GENERATOR
1003 STATE FEEDBACK GAINS
1004 INVERTED ROBOT

The invention claimed is:

1. An inverted vehicle which keeps an inverted state, the inverted vehicle comprising driving means with a wheel and a load to be controlled to keep the inverted state, the load being disposed above the wheel with a link interposed therebetween, the inverted vehicle comprising:
a control device, the control device configured to execute the following control of:
defining a load angular position as an angle between a straight line connecting a center of gravity of the load with a center of gravity of the wheel and a vertical straight line; and
a control switching unit configured for the following:
applying a linear feedback torque to the inverted vehicle, the linear feedback torque being calculated based on a load angular position tracking error that is obtained by subtraction of the load angular position from a load angular position reference input, the load angular position reference input being obtained based on a wheel horizontal speed reference input, and
applying not the linear feedback torque but only damping torque to the inverted vehicle when the load angular position is in a damping range, the damping range being a width in the vicinity of the load angular position reference input.

2. The inverted vehicle according to claim 1, wherein the damping range is calculated by multiplying an absolute value of the load angular position reference input by a predetermined coefficient.

3. The inverted vehicle according to claim 1, wherein a viscous friction is used as the damping torque.

4. The inverted vehicle according to claim 3, wherein a damping parameter is calculated as a function of the load angular position tracking error and the load angular position, the damping parameter being the viscous friction.

5. The inverted vehicle according to claim 4, wherein the damping parameter is calculated by subtracting half of an absolute value of the load angular position reference input from the load angular position tracking error, dividing an absolute value of the subtracted value by the absolute value of the load angular position reference input, and multiplying the divided value by a constant.

6. The inverted vehicle according to claim 3, wherein a damping parameter is defined as a constant value, the damping parameter being the viscous friction.

7. The inverted vehicle according to claim 4, the control device further comprising:
a switching linear torque calculation unit calculating the damping torque and the linear feedback torque, the damping torque being obtained by applying a negative sign to a product of a load angular speed and the damping parameter, the load angular speed being a first differential value of the load angular, the linear feedback torque being obtained based on the load angular position tracking error; and
the control switching unit switching and outputting the damping torque and the linear feedback torque calculated by the switching linear torque calculation unit.

8. The control device of the inverted vehicle according to claim 7, wherein the control switching unit outputs the damping torque if $0 \leq \text{sgn}(\theta_1^*) \cdot e < h$, and outputs the linear feedback torque otherwise,
where $e = \theta_1^* - \theta_1$ holds, $\theta_1^*$ is the load angular position reference input, $\theta_1$ is the load angular position, sgn (•) is a signum function indicating +1 if • is positive, −1 if • is negative, and 0 if • is zero, and h is the damping range calculated by multiplying the absolute value of the load angular position reference input by a predetermined coefficient.

9. The inverted vehicle according to claim 2, wherein a viscous friction is used as the damping torque.

10. The inverted vehicle according to claim 5, the control device further comprising:
a switching linear torque calculation unit calculating the damping torque and the linear feedback torque, the damping torque being obtained by applying a negative sign to a product of a load angular speed and the damping parameter, the load angular speed being a first differential value of the load angular, the linear feedback torque being obtained based on the load angular position tracking error; and
the control switching unit switching and outputting the damping torque and the linear feedback torque calculated by the switching linear torque calculation unit.

11. The inverted vehicle according to claim 6, the control device further comprising:
a switching linear torque calculation unit calculating the damping torque and the linear feedback torque, the damping torque being obtained by applying a negative sign to a product of a load angular speed and the damping parameter, the load angular speed being a first differential value of the load angular, the linear feedback torque being obtained based on the load angular position tracking error; and the control switching unit switching and outputting the damping torque and the linear feedback torque calculated by the switching linear torque calculation unit.

12. The control inverted vehicle according to claim 10, wherein the control switching unit outputs the damping torque if $0 \leq \text{sgn}(\theta_1^*) \cdot e < h$, and outputs the linear feedback torque otherwise, where $e = \theta_1^* - \theta_1$ holds, $\theta_1^*$ is the load angular position reference input, $\theta_1$ is the load angular position, sgn (•) is a signum function indicating +1 if • is positive, −1 if • is negative, and 0 if • is zero, and h is the damping range calculated by multiplying the absolute value of the load angular position reference input by a predetermined coefficient.

13. The inverted vehicle according to claim 11, wherein the control switching unit outputs the damping torque if $0 \leq \text{sgn}(\theta_1^*) \cdot e < h$, and outputs the linear feedback torque otherwise, where $e = \theta_1^* - \theta_1$ holds, $\theta_1^*$ is the load angular position reference input, $\theta_1$ is the load angular position, sgn (•) is a signum function indicating +1 if • is positive, −1 if • is negative, and 0 if • is zero, and h is the damping range calculated by multiplying the absolute value of the load angular position reference input by a predetermined coefficient.

* * * * *

UNITED STATES PATENT AND TRADEMARK OFFICE
CERTIFICATE OF CORRECTION

PATENT NO. : 8,612,127 B2
APPLICATION NO. : 12/993194
DATED : December 17, 2013
INVENTOR(S) : Andoh Page 1 of 1

It is certified that error appears in the above-identified patent and that said Letters Patent is hereby corrected as shown below:

In the Specification

Column 6, line 63, at [Equation 8], change

" $(m_1 + m_2) \ddot{y}_2 - m_1 l \ddot{x}_2 \sin\theta_1 - m_1 l \dot{\theta}_1^2 \cos\theta_1 m_2 g = 0 \quad (7)$ " to -- $(m_1 + m_2) \ddot{y}_2 - m_1 l \ddot{\theta}_1 \sin\theta_1 - m_1 l \dot{\theta}_1^2 \cos\theta_1 + m_2 g = 0 \quad (8)$ --.

Column 7, line 12, at [Equation 10], change

" $D(r\dot{\theta}_2 - \dot{x}_2) = 0$ " to -- $D(r\dot{\theta}_2 - \dot{x}_2)$ --.

Column 7, line 16, change "[Equation 1]" to -- [Equation 11] --.

Column 7, line 45, at [Equation 13], change "- T ref" to -- - rT ref --.

Column 8, line 15, change "$\theta_1$, which" to -- $\theta_1$, at which --.

In the Claims

Column 14, line 35, claim 8, change "The control device of the inverted" to -- The inverted --.

Column 15, line 7, claim 12, change "The control inverted" to -- The inverted --.

Signed and Sealed this
Twenty-seventh Day of May, 2014

Michelle K. Lee
*Deputy Director of the United States Patent and Trademark Office*